United States Patent Office 3,163,534

Patented Dec. 29, 1964

3,163,534

LITHOGRAPHIC PLATE INCLUDING A HYDROPHILIC BARRIER LAYER COMPRISING A SILANE, AN ACRYLIC COMPOUND, AND AN ORGANIC METAL ESTER

Dolor N. Adams and Jack L. Sorkin, Cleveland Heights, Ohio, assignors to Harris-Intertype Corporation, Cleveland, Ohio, a corporation of Delaware No Drawing. Filed Mar. 13, 1961, Ser. No. 95,041
28 Claims. (Cl. 96—75)

The present invention relates to a lithographic plate and, more particularly, to a novel barrier layer or sub-layer which is interposed between the support member and a sensitizer, such as a diazo sensitizer.

In the preparation of a lithographic printing surface, it is known to provide a hydrophilic sub-layer between a backing or support member and a light-sensitive coat. Subsequently, selected areas of the light-sensitive coat are exposed to light, as through a stencil or negative or positive transparency, and the plate then developed in a manner known in the art. In so doing, predetermined areas of the light-sensitive coat are removed, depending on whether a positive or negative working type of light-sensitive agent is used, revealing corresponding underlying areas of the sub-layer. In practice the exposed portions of the sub-layer form the non-printing areas of the plate and, due to their hydrophilic nature, inhibit scumming and thereby prolong the press life of the resulting lithographic plate.

The use of diazo sensitizers, especially those of the negative working type, has become popular in recent years, because a completed "presensitized" plate may be prepared which can be stored in light-tight packages for several months prior to use. At that time the plate is converted to a printing plate or surface by exposure to a light source through a negative, stencil, transparency, or the like, followed by washing with a developer, usually water. However, even presensitized plates have a limited guaranteed storage life which may be as short as six months or less. It is sometimes necessary to store plates for longer periods than this. In particular, printers who purchase in relatively large quantities must store some plates for relatively long periods of time prior to use and therefore cannot always use the presensitized type of plate.

For such printers, a plate is prepared having a desired hydrophilic sub-layer but lacking an overlying light-sensitive coat. At the time of use, the printer merely swabs or wipes on a solution of a sensitizer and dries the plate which is then ready for exposure. Accordingly, such plates having only a sub-layer are known in the art as "wipe-on" plates. However, since the hydrophilic layer is exposed in such a plate and is not protected by an overlying layer of a sensitizer, as in the case of a presensitized plate, the sub-layer deteriorates in time and loses its hydrophilic character. Consequently, even in the case of presently known wipe-on plates, there is a time limitation as to use.

In an application Serial No. 666,787, filed in the name of Melvin J. Astle, now Patent No. 2,991,204, there is described a process for producing a hydrophilic surface, and the resulting product, in which a vinyl tri-substituted silane and an acrylic compound are copolymerized. Such a hydrophilic surface, as mentioned in the cited Astle application, may be used in lithography such as on a roller or a plate. However, especially in the preparation of a plate, the practice heretofore has entailed a rather prolonged treatment at necessary time-temperature relations and required as well certain organic solvents. The present invention relates to improvements, particularly for lithographic plates, wherein preferably a third component is included with the silane and acrylic components. As a result, a plate may be prepared with reduced time-temperature conditions and without the use of organic solvents only, whereby attendant economies and operating advantages are achieved. Other improvements of the present invention will further become apparent as the description proceeds.

In the environment of a lithographic plate, a hydrophilic sub-layer not only provides the water-loving areas of the plate but also serves to reduce scumming when used beneath lithographic sensitizers known in the art. Particularly in case of a diazo light-sensitizer, a barrier or sub-layer between a metal plate and the diazo is needed since, as is well known, direct contact with the metal destroys the diazo compound for lithographic purposes.

The present invention is based on an improved sub-layer or barrier for lithographic plates where in the preferred form a metal ester is incorporated with a vinyl tri-substituted silane and an acrylic compound, at least the last two components being interreacted as hereinafter described. Desirably, the sub-layer or barrier, formed over a support member, comprises multi-layers or strata. In this embodiment, a relatively thick sub-layer can be formed by varying the thickness of the different layers, such as the silane layer, and thereby amply protect any sensitizer such as a diazo resin from being destroyed through chemical reaction with a metal sheet or plate. A still further control on the thickness of the barrier layer is afforded by regulating the amount or depth of copolymerization of a layer of the acrylic compound over a layer of the silane compound.

The support member and overlying sub-layer may be shipped as such in the form of a wipe-on plate or, at any time desired, a lithographic sensitizer such as a diazo compound may be applied. The plate is then exposed to light and washed with a developer, such as water, in a manner known in the art.

It is, therefore, a principal object of the present invention to provide an improved lithographic plate and a process for preparing it.

Another object is to provide a lithographic plate having an improved sub-layer.

A further object is to provide a substantially permanently hydrophilic sub-layer, particularly adapted for use with wipe-on plates.

A still further object is to provide an improved presensitized lithographic plate base.

A still further object is to provide a metal-surface lithographic plate having a multi-barrier layer, each layer being chemically reacted with adjacent layers and the bottommost layer being chemically reacted as well with the metal surface of the plate.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

GENERAL CONCEPT

In accordance with the present invention, a sub-layer or barrier is formed from a metal ester, a vinyl trisubstituted silane, and an acrylic compound over a support or backing member of a lithographic plate. The three components may be applied in admixture; or the metal ester and silane may be applied in admixture with a subsequent overlay of the acrylic compound; or the three components may be applied as individual layers. In any event, the three components are interreacted. Where superposed layers of the ingredients are used, there is reaction between adjacent layers. Where the support member is metal-surfaced, there is also reaction with such metal. After formation of the sub-layer, a conventional lithographic sensitizer may be applied and the plate exposed to light and developed in a manner known in the art.

COMPONENTS

The metal esters contemplated are those having the formula, $(R_1O)_4M$, wherein $R_1$ is a monovalent hydrocarbon radical selected from the group consisting of aryl radicals, such as phenyl, tolyl, xylyl; and all aliphatic radicals of one to eight carbon atoms, including alkyl, isoalkyl, alkylene, isoalkylene, alkenyl, isoalkenyl radicals, that is, without regard to degree of saturation or spatial isomerism; and wherein M is titanium or zirconium. The metal thorium has become more available in recent years and has the same chemical behavior characteristics as titanium and zirconium and therefore M may also be thorium. However, titanium and zirconium are preferred. Such compounds, regardless of the metal used, are commonly referred to as metal ortho esters and also as alcoholates or phenylates. The tetraalkyl metal esters are preferred and of these tetraisopropyl titanate is preferred.

The manner of preparing these materials, hereinafter for convenience referred to as the "ester," is known in the art. Reference is made, for example, to United States Patent No. 2,187,821 which is hereby incorporated by reference. As described, one method of preparation comprises, for instance, reacting an alcohol with a halide, preferably the chloride, of titanium in the presence of ammonia.

The vinyl tri-substituted silanes which may be used, hereinafter for convenience referred to as the "silane," have the following formula:

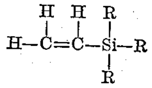

wherein R is a monovalent substituent selected from the group consisting of alkoxy radicals, aryloxy radicals, and halogen atoms. For example, when an alkoxy radical is used, R may be methoxy, ethoxy, propoxy, butoxy, and pentoxy; when an aryloxy radical is used, R may be phenoxy, tolyloxy, and xylyloxy; and when a halogen atom is used, R may be chlorine, fluorine, iodine, and bromine. Partial polymers of the foregoing silanes may also be used. The vinyl trimethoxy and vinyl triethoxy silanes give the best results of the vinyl trialkoxy silanes, and vinyl trichloro and vinyl tribromo silanes are better than the other vinyl tri-halogenated silanes.

The acrylic compounds employed are monomeric acrylic compounds, such as acrylic acid, methacrylic acid, the water-soluble salts of such acids, such as the ammonium, sodium, and potassium salts, acrylamide, and methyl acrylamide.

Ordinarily, the support member of the lithographic plate is metal-surfaced or entire sheets of metal may be used. This practice is preferable since a direct chemical union is then achieved between the metal and the sub-layer to form a strong bond therebetween. Metals such as aluminum, zinc, copper, chromium, tin, magnesium, steel, and the like may be used. Aluminum and zinc are preferred. However, other supports or backing members may be employed, and in this instance the other advantages of the present sub-layer are retained. For example, a paper sheet or plate suitably backed, or the paper sheet impregnated with a thermosetting resin such as phenol formaldehyde can be employed. In these instances, the sub-layer is also bonded to the paper or its resin impregnant but adheres thereto in the manner of a paste and may not chemically unite with this type of backing member. However, should a paper surface or resin impregnant have active chemical groups, such as hydroxyl groups, there may also be reaction between the components of the invention and such active groups. A heat-resistant resin impregnant is preferably used, snice it protects the paper during the heating steps which may be used in preparing a lithographic plate in accordance with the method disclosed herein. In the case of metallic surfaces, oxides may be present, either through exposure to air or through special treatment. For example, in the case of aluminum, the surface may if desired be chemically or electrolytically anodized, although this is not necessary. Also in the case of metallic surfaces, pretreatments may, if desired, be carried out to hydroxylate or oxidize followed by hydration of the metal surface and thereby facilitate chemical reaction of such surface particularly with the metal esters. This concept is described and claimed in greater detail in application Serial No. 74,780, filed in the names of Sorkin and Thomas. This application is hereby incorporated by reference.

The lithographic sensitizer or light-sensitive agent employed may be any of those known in the art for use on a surface lithographic plate, the present invention residing in the sub-layer and not being related to any particular light-sensitive agent used. Both negative and positive working sensitizers are contemplated for the present surface plates. For example, commonly known tannable colloids and tanning agents may be used. These include bichromated albumin, casein, gum arabic, gelatin, glue, a copolymer of polyvinyl-methylether and maleic anhydride, polyvinyl alcohol, and the like. In all of such cases, as is understood in the art, hexavalent chromium ions chemically react with the companion material, such as casein, under the action of light to alter the water-solubility of the coating and delineate printing and non-printing areas of the plate. This action of the chromium ion is thus well known in the art and may be provided by adding ammonium chromate or dichromate, sodium chromate or dichromate, potassium chromate or dichromate, and the like. In addition to these, certain organic chromates and dichromates may also be used. For example, the reaction product of a quaternary ammonium hydroxide and chromic acid, or ethylene diamine and chromic acid or a soluble dichromate may be employed. Such organic materials may be advantageous in that they show less tendency to crystallize and therefore produce a more uniform sensitized coating. Diazo compounds such as the condensation product of paraformaldehyde with p-diazo-diphenylamine sulfate may also be used as a tanning agent in combination with the mentioned colloids.

Additionally, for the lithographic sensitizer the polymeric cinnamic acid esters of U.S. Patent No. 2,610,120; or the light-sensitive polymers of U.S. Patent No. 2,861,058; or the light-sensitive high molecular compounds of U.S. Patent No. 2,948,706 may be used. These three patents are also incorporated by reference.

A diazo compound such as is commonly used in the preparation of presensitized lithographic plates may be used per se as the sensitizer. It is emphasized that the nature of the diazo material is not critical to the practice of the invention. Accordingly, the light-sensitive diazo or diazide may be either of the coupling or non-coupling types or of the positive or negative working types.

Descriptions of the various diazo sensitizers which may be used are set forth in the following United States Patents which are hereby incorporated by reference: Nos. 2,063,631; 2,100,063; 2,667,415; 2,679,498; 2,692,827; 2,772,972; and 2,778,735.

A method of preparing a very satisfactory diazo is described in Patent No. 2,679,498 and in Patent No. 2,100,063. This compound is a condensation product of paraformaldehyde with p-diazo-diphenylamine sulfate. Upon exposure to light, such as ultra-violet light, this type of light-sensitive diazo compound expels nitrogen from the molecule and forms a water-insoluble, hydrophobic and oleophilic material which then becomes the printing image. The unexposed portions of the compound are readily washed away by known developer solutions, usually water.

As used herein and in the claims the term "lithographic sensitizer" is taken to mean either a light-sensitive diazo compound of the types just described, or a light-sensitive agent consisting of both a chromium component and the material used in combination therewith such as gum arabic, or any of the previously noted materials.

PREPARATION

In general, whether the defined components are applied in admixture or singly, such components are applied to a support member from a solvent followed by evaporation to remove the solvent and deposit a component or components as a layer. Organic solvents may always be used, and in the case of applying the acrylic component alone, water may additionally be used as the solvent for such component. The use of heat hastens the evaporation and promotes the desired chemical reaction and is, therefore, preferably used except in the case where the metal ester is applied singly. In this instance, merely drying the plate as by whirling promotes the desired result. As a further aid in promoting the desired chemical reaction and reducing the time required for preparation, catalysts may also be incorporated with the solvent for a component or components.

In the case where the silane, ester, and acrylic components are applied in admixture, organic solvents may be used such as aromatic solvents like toluene, benzene, and xylene; alcohols like methanol, ethanol, propanol, and isopropanol; aliphatic solvents like pentane, hexane, and heptane; and chlorinated aliphatic solvents such as carbon tetrachloride, and the like. Relative amounts are not critical. Upper limits are set by the solubility of a component in a particular solvent. Recommended ranges by weight percent in the solvent include about 0.1 percent to about 10 percent for each component, namely, the ester, the silane, and the acrylic components. Various ratios may be used, but a preferred ratio is equal molar weight of the three components. In any event there should be sufficient acrylic component to react with the vinyl groups of the polysiloxane. Any known method of coating suitable for providing a substantially uniform coat may be used such as, for example, roller coating, blade coating, dipping, whirling, or spraying. Such methods of coating may be used for any of the applications or coating steps herein described.

Following the application of the admixture, the plate is allowed to dry. However, heat, as from infrared lamps, is preferably used to remove the solvent and effect the interaction of the components which results in a deposition of a barrier layer. Temperatures of about 130° C. to about 210° C. for about 5 minutes to about 16 hours may be used. The exact mechanism involved among the three components is not known, although there is condensation of the silane to a polysiloxane and reaction with the vinyl groups thereof with the acrylic component. The metal ester hydrolyzes readily and absorbs moisture from the atmosphere for this purpose if none is otherwise available. When so hydrolyzed, the ester is quite reactive chemically through the hydroxyl groups. When metal comprises the surface of the lithographic plate, there is also chemical reaction therewith resulting in a strongly adhered barrier layer. The metal ester has been found to lower both time and temperature requirements for the reaction as compared with reacting just the silane and acrylic components as in the cited Astle application, Serial No. 666,787, now Patent No. 2,991,204.

In the preferred embodiment of the invention, the metal ester and silane are applied to the plate in admixture and a layer of their reaction product then deposited on the plate. This reaction-product layer is next contacted with the acrylic component. This technique has the advantage of orienting the hydrophilic polar group of the acrylic component at the outer surface of the sub-layer.

The solvent for the ester and the silane may be any of those noted for the admixture. However, when the silane and acrylic components are not applied together, superior results are obtained when certain solvents are used for the silane. Tests show that the choice of a solvent for the silane has a marked effect on the formation of scum spots and streaks and also on the strength of an overlying image formed from a lithographic sensitizer. However, the choice of a solvent for the acrylic component shows no marked effect except that such solvent must be compatible with the polysiloxane when penetration occurs, as hereinafter noted. Solvents for the silane which produce such superior results include methanol, toluene, benzene, and isopropanol. While relative amounts are not critical, ranges by weight percent in the solvent of about 0.1 percent to about 10 percent for each the ester and the silane are operable. A sufficient amount of a catalyst may also be present in the solvent to speed the reaction, although a catalyst is not necessary in view of the presence of the metal ester. A concentration of catalyst of one percent or less by weight has been found to be satisfactory. This range is not critical. Catalysts that may be used include ammonium hydroxide, ethanolamine, diethanolamine, triethanolamine, dimethylaniline, and diethylaniline.

Following application of the ester-silane mixture, the plate is dried as before, preferably with heat. The solvent is evaporated and a barrier layer formed from the ester-silane mixture is deposited over the plate. Temperatures of about 130° C. to about 170° C. for about five minutes to about two hours may be used to deposit the barrier layer. Again there is condensation of the silane to a polysiloxane, although the vinyl groups of the latter remain unreacted. Again, also, the ester hydrolyzes and aids the reaction by its active hydroxyl groups, particularly the reaction with a metal plate. It has also been postulated that the metal ester may act as a catalyst for the desired reaction and condensation. Even in this instance, the metal ester acts not only as a catalyst for the silane condensation but actually forms part of the final product, so that a silane-metal copolymer may be formed, especially when the metal ester and the silane are deposited from the same solution.

After the ester-silane layer has been deposited, the acrylic component is applied thereover. If penetration of the polysiloxane is desired, the solvent for the acrylic compound must be compatible with the silane, that is, the solvent must be unreactive with the condensed polysiloxane and capable of soaking into it. As used here and in the claims, the term "compatible" solvent is intended to have this definition.

By penetrating the silane film, the solvent facilitates the acrylic compound in reaching the vinyl groups of the silane for copolymerization therewith. Inasmuch as the polysiloxane layer has been chemically anchored to the metal by the preceding treatment, the polysiloxane cannot be lifted from the metal surface by any solvent used for the acrylic compound. The amount of penetration and resulting stratification of the condensed polysiloxane and copolymerized silane-acrylic compound can be varied by the temperature and time of contact by the acrylic compound solvent with the polysiloxane coat. Indeed, there may be little or no penetration with only an interfacial copolymerization of the polysiloxane layer and the acrylic compound.

The solvent for the acrylic compound or component may be selected from the following: benzene, toluene, xylene, pyridene, petroleum ether, methanol, ethanol, butanol, monoalkyl ethers of ethylene glycol (Cellosolve) such as the methyl, ethyl, butyl, and isobutyl ethers of ethylene glycol, chloroform, carbon tetrachloride, and the like. It is necessary only that the acrylic component be sufficiently soluble in a selected solvent to be applied to a plate in a manner described. For example, about 0.7 gram of sodium acrylate dissolves in about 100 grams of 99 percent ethyl alcohol at room temperature. This is sufficient for purposes of the invention. Water may also be the solvent for the acrylic component as hereinafter described.

The concentration of the acrylic component in its solvent is not critical. An amount sufficient to cover the condensed polysiloxane film to an extent desired may be initially incorporated in the solvent. As an example, the concentration may range from about 1 percent to 15 percent, although concentrations outside of this range may be employed, repeated applications being carried out if needed. A sufficient amount of a catalyst may also be incorporated with the acrylic component. The free radical-forming catalysts such as benzoyl peroxide, acetyl peroxide, urea peroxide, hydrogen peroxide, cumene hydroperoxide, potassium persulfate, and the like are usable. The catalysts may be dispersed in the solvent for the acrylic compound if necessary. An exemplary range which may be used for the catalyst is up to one percent by weight of the solution.

The heating effecting the copolymerization of the polysiloxane and acrylic compound should be continued for a sufficient time to ensure reaction between the vinyl groups of the polysiloxane and the acrylic component. This copolymerization is hereby defined as "heating to produce a hydrophilic stable copolymer," the term "stable" referring to the chemical stability of the copolymer with respect to the diazo resin. The time and temperature required for so properly effecting the copolymerization is readily determined by trial and error runs. The rate of polymerization is affected by the temperature, catalyst, and concentration of catalyst employed. The recommended temperature range for copolymerizing the polysiloxane and acrylic component is from about 120° C. to 300° C. for 10 minutes to 12 hours. However, higher temperatures may be employed. Any temperature limit may, in fact, be set by practical considerations, such as avoiding a temperature sufficiently high to anneal the metal of the lithographic plate. It is also recommended to raise the temperature of the polymerization, either initially or terminally of the polymerization step, above the boiling point of the solvent for the acrylic compound to ensure vaporization and removal of traces of the solvent. Heating the reactants for 8 to 10 hours at 160° C. has worked satisfactorily, although heating for a longer time at a lower temperature and heating for a shorter time at a higher temperature are also operative.

An important advantage of the present sub-layer material is that should it be heated too long or dried from other causes, it does not crack and its hydrophilic character can be quickly restored by allowing the material to absorb or otherwise soak up water. This sub-layer material, therefore, does not deteriorate in the manner of a siliceous sub-layer.

An exception to the use of an organic solvent for the acrylic component is possible if a reaction at substantially only the interface between the polysiloxane and the acrylic component is acceptable. In this case, the acrylic component is applied from aqueous solution which may, for example, contain about 0.1 percent to about 10 percent by weight of such component. To effect reaction with an acrylic component in an aqueous medium, the plate is immersed and retained in the water until the desired reaction between the polysiloxane and the acrylic component is complete. Warming the aqueous solution hastens the reaction and correspondingly reduces the time required. If the solution is heated from about 30° C. to about 95° C. with the plate or other support member immersed therein, the reaction may be carried out in about 5 minutes to about 15 minutes. In particular, sub-layers have been deposited in the manner just described by immersing a plate for five minutes at 90° C. As will be noted, the use of an aqueous solvent for the acrylic component materially reduces the time and temperature requirements for producing a plate. This technique is therefore best suited for economical commercial production.

While little or no penetration of the polysiloxane or silane-metal copolymer occurs when the acrylic component is applied from aqueous solvent, this practice has the advantages of being much less expensive, avoiding the problems of fumes and the like attending the use of organic solvents, while still providing a copolymer of the polysiloxane and acrylic component which is well adhered to the sub-stratum or sub-strata of the barrier layer. In fact, the use of water as the solvent for the acrylic component can so shorten the previous time-temperature requirements that, not withstanding the foregoing, it is within the contemplation of the invention to omit the metal ester, applying the acrylic component from aqueous solution as described over a polysiloxane which has been applied to a support member as the silane and condensed in the manner previously described. Use of a water solvent for the acrylic component enables the normal sequential steps of contacting the polysiloxane with the acrylic component and heating the assembly to be performed simultaneously.

As another modification, the solvent for the acrylic component may contain a hydrophilic agent selected from the group consisting of carboxymethyl cellulose, carboxyethyl cellulose, and vinyl pyrrolidone to enhance the resulting hydrophilic character of the sub-layer. Such an agent may be present in amounts ranging from about 0.3 percent to 5 percent based on the weight of the acrylic component.

As indicated, the embodiment comprising a support member having a first layer formed from the metal ester and silane components with an over layer comprising the reaction product of the first layer with the acrylic component represents the preferred practice of the invention. Lithographic plates prepared with this type of sub-layer give excellent prints, roll up well, and withstand storage in a humidity cabinet having a temperature of 110° F. and a relative humidity of 70 percent for at least one week. Such plates have produced 40,000 impressions without failure.

In another embodiment, each of the defined components may be applied separately to the support member. In this instance, the metal ester is applied first. The organic solvent for the application of the ester also may vary widely. Aromatic solvents such as benzene, toluene, and xylene may be used; also solvents such as acetone, methyl-ethyl ketone, tetrahydrofurane, and the chlorinated hydrocarbons may be used. But a preferred solvent for the metal ester when used alone comprises the humectants or hydroscopic solvents which absorb moisture from an ambient atmosphere. This action supplies a ready source of water for the hydrolysis and literally "boosts" such hydrolysis. When the solvent employed is not a humectant, as in the case of toluene, the solvent must first be substantially removed after deposition on a plate before the hydrolysis of the ester can take place, thus unnecessarily delaying the hydrolysis of the metal ester. The humectant solvents include, for example, the anhydrous or substantially anhydrous alcohols, such as methyl, ethyl, propyl, isopropyl, butyl, and isobutyl alcohols, ethylene glycol, diethylene glycol, glycerol, Cellosolve, Cellosolve acetate, Cellosolve butylate, methy Cellosolve, butyl Cellosolve, Carbitol, butyl Carbitol, and the like.

The solvent may contain from about 0.1 percent to about 10 percent by weight of the ester. If desired, titanates and zirconates can be used in combination. Following application of the ester solvent, the plate is dried as by whirling to deposit a layer of the hydrolyzed metal ester which in the case of a metal-surfaced plate, as an example, is chemically bound thereto. In this regard, the hydration of the ester may be permissive, that is, allowed to be effected by the moisture in the atmosphere. The hydrolysis mechanism is thought to involve the formation of an intermediate complex between the metal ester and the water. The hydroxy ester cannot be isolated since it immediately reacts to give a dimer. Thereafter, the silane and acrylic components may be applied in the order stated, using the solvents and conditions described for the immediately preceding embodiment.

Regardless of how the sub-layer or barrier layer is applied, the lithographic sensitizer is coated over such layer as a final step in preparing the plate. The sensitizer may be applied over the sub-layer in a conventional manner as by roller coating, dipping, spraying, and the like. A sufficient amount should be used to cover the entire sub-layer. The light-sensitive tanning agents form an image when exposed to light in accordance with techniques of lithographic operation. Negative-working diazo compounds are usually applied from an aqueous solution, while positive working diazos are usually applied from organic solvent as is known in the art. The thickness of the diazo film is not critical, a residue of about 0.003 gram per square foot of plate being an accepted practice. Aqueous solutions of up to about two percent diazo compound have also been employed.

If desired, the manufacturer of a lithographic plate of the present invention can stop short of the application of the light-sensitive agent, so that a wipe-on plate having only the sub-layer can be shipped to a printer.

EXAMPLES

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

*Example I*

An aluminum plate was dipped into the following solution:

| | | |
|---|---|---|
| Isopropanol (anhydrous) | cc | 100 |
| Vinyl triethoxy silane | cc | 1 |
| Tetraisopropyl titanate | cc | 1 |
| Acrylic acid (glacial) | cc | 1 |
| Di-t-butyl peroxide | gram | 0.01 |

The plate was then baked for five minutes at 170° C. and washed with water for five minutes. A rotating rubber roller wet with a 0.8 percent diazo aqueous solution is rolled over the resulting sub-layer to apply a continuous coating of the diazo solution. The diazo material used consisted essentially of a condensation product of paraformaldehyde with p-diazo-diphenylamine sulfate and is sold under the trade name Fairmont Diazo No. 4. The plate was then dried by air currents from an electric fan.

After exposing the diazo sensitizer to light through a negative, the plate was developed by washing with water. The resulting plate printed 35,000 impressions before showing any tendency for the ink-attractive printing image to break.

*Example II*

A solution was prepared containing:

| | Grams |
|---|---|
| Vinyl triethoxy silane | 30 |
| Tetraisopropyl titanate | 30 |
| Toluene | 535 |
| Ethanolamine | 6.6 |
| Butanol (to increase the solubility of the ethanolamine catalyst) | 5 |

An approximate 10 percent solution of acrylic acid was prepared containing:

| | Grams |
|---|---|
| Acrylic acid (glacial) | 30 |
| Xylene | 270 |
| Benzoyl peroxide | 0.3 |

A mixture was prepared containing 1 part by weight of the silane solution to 3 parts by weight of the acrylic acid solution. The mixture was coated on metal plates. Some of the plates were baked for 2 to 16 hours at 170° C., while others were baked for 10 to 30 minutes at 270° C. In each instance a hydrophilic sub-layer was deposited on the metal plate. After sensitizing the plates and exposing them to light through the stencil in a conventional manner, the plates were placed on a printing press for a printing operation. In particular, a bichromated colloidal dispersion of an albumin sensitizer was applied over the sub-layer and after drying the plate was ready for exposure.

*Example III*

A procedure was carried out like the procedure of Example II except that the silane and acrylic acid solutions were mixed in a 1:1 weight ratio.

*Example IV*

A procedure was carried out like the procedure of Example II except that the silane and acrylic acid solutions were mixed in a 3:1 weight ratio.

*Example V*

A procedure was carried out like the procedure of Example II except that the silane and acrylic acid solutions were mixed in a 1:9 weight ratio.

*Example VI*

A zinc plate was dipped into a 10 percent by weight solution of tetraoctyl titanate in isopropanol and air dried. The plate was then dipped into a solution consisting of 180 cc. of methanol and 20 cc. of vinyl trichloro silane. The plate was then baked for 10 minutes at 170° C. and subsequently immersed for 30 minutes in a solution comprising:

| | | |
|---|---|---|
| Acrylic acid (glacial) | cc | 10 |
| Ethanol (anhydrous) | cc | 990 |
| Benzoyl peroxide | gram | 0.1 |

The plate was next baked for 30 minutes at 170° C. and finally washed with water for five minutes. The plate was then dried under infrared lamps and dipped into a 2 percent aqueous solution of Fairmont's Diazo Resin No. 4. The plate was allowed to dry at room temperature and then exposed through a suitable negative for 30 lux units generated from carbon arcs. The plate was then washed with water to remove the non-exposed diazo, desensitized, and inked for printing in the usual manner. The image held well and the background was clean.

*Example VII*

An aluminum plate was dipped into the following solution:

| | | |
|---|---|---|
| Benzene | cc | 100 |
| Tetra-in-octyl zirconate | gram | 1 |
| Vinyl triethoxy silane | cc | 1 |

The plate was then air dried and baked for five minutes at 170° C. The plate was next dipped into the following solution at room temperature:

| | | |
|---|---|---|
| Acrylamide | grams | 10 |
| Isopropanol (anhydrous) | cc | 90 |
| Urea peroxide | gram | 0.1 |

The plate was again baked at 170° C., this time for 10 minutes, and then washed with water for five minutes. An aqueous dispersion of bichromated casein is now blade coated over the resulting sub-layer to sensitize the plate which is then finally air dried. After exposure thorugh a stencil in the usual manner followed by development, the plate was installed in a press and printed many thousand impressions before any image breakdown was noticeable.

*Example VIII*

A zinc plate was dipped into the following solution:

| | Cc. |
|---|---|
| Vinyl trimethoxy silane | 10 |
| Tetraisopropyl titanate | 10 |
| Isopropanol (anhydrous) | 90 |
| Ammonium hydroxide (28% aqueous solution) | 3 |

The plate was allowed to drain dry and then baked for five minutes at 170° C. The plate was then immersed for five minutes into the following solution maintained at least at 90° C.:

| | | |
|---|---|---|
| Water | cc. | 100 |
| Acrylic acid (glacial) | cc. | 1 |
| Ammonium persulfate | gram | 0.02 |

The plate was washed with tap water for several minutes after which a bichromated gelatin colloidal dispersion was applied over the resulting barrier layer in an amount to cover a layer and form a film of suitable thickness for lithographic reproduction techniques.

*Example IX*

The following exemplifies a preferred practice of the invention. An aluminum sheet was immersed for 3 minutes at 70° C. in a 20 percent aqueous solution of trisodium phosphate to clean and etch the aluminum surface. This surface was then flushed with tap water for 1 minute and then desmutted by dipping for 2 minutes in a 70 percent nitric acid solution maintained at room temperature. The plate was again flushed, first for 1 minute with top water at room temperature and then for about 1 minute with deionized water, after which the plate was allowed to dry.

The plate was next dipped into an isopropanol solution containing 1 percent each of vinyl triethoxy silane and tetraisopropyl titanate, such solution being at room temperature. The plate was then baked for five minutes at 170° C. to deposit a layer from the silane and titanate. At this stage this layer was not wettable by water. Next the plate was immersed for five minutes in an aqueous solution of 1 percent by weight of acrylic acid, 0.03 percent carboxymethyl cellulose and 0.02 percent of ammonium persulfate. This solution was maintained at 90° C. After removal from the acrylic acid solution the plate was washed for five minutes with tap water and then for an additional minute with deionized water. The resulting layer was now wettable by water.

An aqueous solution containing 0.5 percent by weight of Fairmont's Diazo Resin No. 4 was then coated over the previous sub-layer preparation by means of a whirler. The plate thus prepared was allowed to dry and in this form could be stored or used immediately for exposure. In one instance a plate prepared in accordance with this example printed 40,000 impressions without failure. It also withstood storage for 12 days in a humidity cabinet having a temperature of 110° F. and a relatively humidity of 70 percent without failure. On a printing press the plate was still clean after 6 rollups.

In any of the foregoing examples, equivalent compounds and solvents disclosed herein may be substituted for those stated in the examples, the times and temperatures being adjusted where and if needed as easily determined by trial and error.

Other forms embodying the features of the invention may be employed, change being made as regards the features herein disclosed, provided those stated by any of the following claims or the equivalent of such features be employed.

We therefore particularly point out and distinctly claim as our invention:

1. A process of forming a sub-layer on a lithographic plate adapted to form the hydrophilic non-printing areas thereof, comprising applying to a support member having a chemically reactive surface a coat of an admixture comprising a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; an acrylic compound selected from the group consisting of acrylic acid, methacrylic acid, the ammonium, sodium, and potassium salts of said acids, acrylamide, and methyl acrylamide; and a metal ester having the formula $$(R_1O)_4M$$

wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester; and interreacting such components of the admixture to form on the support member a hydrophilic sub-layer while reacting the hydrolyzed ester with such reactive surface of the support member.

2. A process of preparing a wipe-on lithographic plate comprising coating a support member having a chemically reactive surface from organic solvent with an admixture of a vinyl tri-substituted silane having the formula $$CH_2CHSiR_3$$

wherein R is a monovalent substituent selected from the group consisting of methoxy, ethoxy, propoxy, butoxy, pentoxy, phenoxy, tolyloxy, xylyloxy, chlorine, fluorine, iodine, and bromine; and acrylic compound selected from the group consisting of acrylic acid, methacrylic acid, the ammonium, sodium, and potassium salts of said acids, acrylamide, and methyl acrylamide; and a metal ester having the formula $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester, and then heating to remove the solvent and interreact such components of the admixture while simultaneously reacting the hydrolyzed ester with the chemically reactive surface of the support member to deposit on the support member a hydrophilic sub-layer adapted to form the non-printing areas of the lithographic plate.

3. In a process of preparing a lithographic plate having a support member and an overlying coat of a lithographic sensitizer reactive to light to define printing and non-printing areas, the improvement of providing an intermediate coat between the support member and sensitizer coat characterized by directly coating a support member having a chemically reactive metal surface with an organic solvent containing about 0.1 percent to about 10 percent by weight of a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; about 0.1 percent to about 10 percent by weight of an acrylic compound selected from the group consisting of acrylic acid, methacrylic acid, the ammonium, sodium, and potassium salts of said acids, acrylamide, and methyl acrylamide; and about 0.1 percent to about 10 percent by weight of a metal ester having the formula $(R_1O_4)M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester; and heating to remove the solvent and interreact such components to deposit on the metal surface of the support member a hydrophilic sub-layer, such hydrolyzed ester also reacting with the metal surface of the support member.

4. A process of forming a sub-layer on a lithographic plate comprising applying to a support member having a chemically reactive surface a coat of an admixture comprising a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester; reacting the hydrolyzed metal ester with the reactive surface of the support member while interreacting the silane and metal ester to deposit on the support member a layer of the resulting reaction product; coating such layer with an arcylic compound selected from the group consisting of acrylic acid, methacrylic acid, the ammonium, sodium, and potassium salts of said acids, acrylamide, and methyl acrylamide; and then reacting the layer with the acrylic compound.

5. A process of preparing a wipe-on lithographic plate comprising directly coating a support member having a chemically reactive surface from organic solvent with an admixture of a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium and zirconium; hydrolyzing the metal ester; heating to remove the solvent and deposit as a layer on the support member a reaction product of such silane and hydrolyzed metal ester while simultaneously reacting the hydrolyzed ester with the reactive surface of the support member; coating such layer from organic solvent with an acrylic compound selected from the group consisting of acrylic acid, methacrylic acid, the ammonium, soduim, and potassium salts of said acids, acrylamide, and methyl acrylamide; again heating to react such layer with the acrylic compound through the vinyl groups of the silane reactant and deposit on the support member a hydrophilic layer essentially formed from such three reactants.

6. In a process of preparing a lithographic plate having a support member and an overlying lithographic sensitizer reactive to light to define printing and non-printing areas, the improvement of providing an intermediate coat between the support member and lithographic sensitizer characterized by directly coating a support member having a metal surface with an organic solvent containing about 0.1 percent to about 10 percent by weight of a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloy, chlorine, fluorine, iodine, and bromine; and about 0.1 percent to about 10 percent by weight of a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester; heating to remove the solvent and deposit as a layer on the metal surface a reaction product of such silane and hydrolyzed metal ester while simultaneously reacting the hydrolyzed ester with such reactive metal surface; said reaction product retaining as unreacted vinyl groups of the silane; covering such layer with a solvent containing about 0.1 percent to about 10 percent by weight from an acrylic compound selected from the group consisting of acrylic acid, methacrylic acid, the ammonium, sodium, and potassium salts of said acids, acrylamide, and methyl acrylamide; and again heating to react such layer and the acrylic compound through the vinyl groups of the reaction product and such acrylic compound and form a multi-layer barrier.

7. The process of claim 6 wherein such acrylic compound solvent contains in addition a hydrophilic agent selected from the group consisting of carboxymethyl cellulose, carboxyethyl cellulose, and vinyl pyrrolidone.

8. The process of claim 6 wherein such acrylic compound solvent is water heated from about 30° C. to about 95° C.

9. The process of claim 6 wherein such metal ester is a tetraalkyl metal ester.

10. The process of claim 6 wherein such metal ester is tetraisopropyl titanate.

11. The process of claim 6 wherein such metal surface is selected from the group consisting of aluminum and zinc.

12. The process of claim 6 wherein the solvent for the silane and metal ester is one selected from the group consisting of toluene, methanol, benzene, and isopropanol.

13. The process of claim 6 wherein such solvent for the silane and metal ester also contains a catalyst selected from the group consisting of ammonium hydroxide ethanolamine, diethanolamine, triethanolamine, dimethylaniline, and diethylaniline.

14. The process of claim 6 wherein such acrylic compound solvent also contains a catalyst selected from the group consisting of benzoyl peroxide, ditertiary butyl peroxide, hydrogen peroxide, ammonium persulfate, acetyl peroxide, urea peroxide, and cumene hydroperoxide.

15. A process of forming a multi-layer barrier on a lithographic plate comprising applying to a support member having a reactive surface a coat of a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester and reacting the hydrolyzed ester with the reactive surface chemically to bond at the interface therebetween a layer consisting essentially of the reaction product of said surface and hydrolyzed metal ester; applying to the layer a coat of a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; drying the silane application to form a second layer over the first layer; applying to the second layer an acrylic compound selected from the group consisting of acrylic acid, methacrylic acid, the ammonium, sodium, and potassium salts of said acids, acrylamide, and methyl acrylamide; and copolymerizing the dried silane layer and the acrylic compound through their common vinyl groups to form a third layer overlying the second layer.

16. A process of preparing a multi-layer on a wipe-on lithographic plate comprising coating a support member having a chemically reactive surface from organic solvent with a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium and zirconium; heating to remove the solvent; hydrolyzing the metal ester and reacting a layer of the hydrolyzed ester to the chemically reactive surface of the support member at least at the interface therebetween; applying to the metal ester layer from organic solvent a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; heating to remove the silane solvent and form a second layer consisting essentially of the reaction product of unreacted hydrolyzed metal ester and such silane having undestroyed vinyl groups of the latter; applying to the second layer from a solvent an acrylic compound selected from the group consisting of acrylic acid, methacrylic acid, the ammonium, sodium, and potassium salts of said acids, acrylamide, and methyl acrylamide; heating to remove the acrylic solvent and copolymerize said reaction product and acrylic compound through their unreacted vinyl groups to form a third layer over the second layer and orient the hydrophilic polar group of the acrylic compound at the outer surface of the three layers; such three superposed layers forming a hydrophilic barrier over the support member adapted to form the non-printing areas of the lithographic plate.

17. In a process of preparing a lithographic plate having a support member and an overlying lithographic sensitizer reactive to light to define printing and non-printing areas, the improvement of providing an intermediate coat between the support member and lithographic sensitizer characterized by directly coating a support member having a metal surface chemically reactive with a hydrolyzed metal ester with an organic solvent containing about 0.1 percent to about 10 percent by weight of a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; heating to remove the solvent; hydrolyzing and chemically reacting the hydrolyzed metal ester with the metal surface to deposit thereover a first layer consisting essentially of a hydroxylated metal ester; applying to the metal ester layer an organic solvent containing from about 0.1 percent to about 10 percent by weight of a vinyl tri-substituted silane having the formula $CH_2CHSiR_3$, wherein R is a monovalent substitutent selected from the group consisting of methoxy, ethoxy, propoxy, butoxy, pentoxy, phenoxy, tolyloxy, xylyloxy, chlorine, fluorine, iodine, and bromine; heating to remove the silane solvent and deposit a second layer; consisting essentially of the reaction product of the hydrolyzed metal ester and such silane retaining the vinyl groups of the latter in unreacted form; applying to the second layer an organic solvent compatible with the polysiloxane and containing from about 0.1 percent to about 10 percent by weight of an acrylic compound selected from the group consisting of acrylic acid, methacrylic acid, the ammonium, sodium, and potassium salts of said acids, acrylamide, and methyl acrylamide; and heating to remove the acrylic compound solvent and copolymerize said reaction product and acrylic compound through their unreacted vinyl groups to form a third layer; such three superposed layers forming a hydrophilic layer over the support member adapted to form the non-printing areas of the lithographic plate.

18. A wipe-on lithographic plate comprising a support member and a hydrophilic barrier layer overlying the support member adapted to form the non-printing areas of the plate; said barrier layer consisting essentially of the reaction product of a hydrolyzed metal ester having the formula, prior to hydrolization, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and an acrylic compound selected from the group consisting of acrylic acid, methacrylic acid, the ammonium, sodium, and potassium salts of said acids, acrylamide, and methyl acrylamide; at least said metal ester being reacted with the support member through hydrolyzed groups of the ester as well as with said silane, said acrylic compound being reacted through its vinyl groups with those in the reaction product of the hydrolyzed metal ester and the silane contributed by the latter reactant.

19. In a lithographic plate adapted for printing having a support member, image areas on the support member comprising the ink-attractive light-decomposed products of the lithographic sensitizer, and non-image areas; the improvement characterized by providing as said non-image areas the reaction product of a hydrolyzed metal ester having the formula, prior to hydrolization, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and an acrylic compound selected from the group consisting of acrylic acid, methacrylic acid, the ammonium, sodium, and potassium salts of said acids, acrylamide, and methyl acrylamide; at least said metal ester being reacted with the support member through hydrolyzed groups of the ester as well as with said silane, said acrylic compound being reacted through its vinyl groups with those in the reaction product of the hydrolyzed metal ester and the silane contributed by the latter reactant.

20. A process of forming a sub-layer on a lithographic plate adapted to form the non-printing areas thereof, comprising applying to a support member having a chemically reactive surface, a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and an acrylic compound selected from the group consisting of acrylic acid, methacrylic acid, the ammonium, sodium, and potassium salts of said acids, acrylamide, and methyl acrylamide; hydrolyzing the ester; and interreacting such components to form on the support member a hydrophilic sub-layer while also reacting the hydrolyzed metal ester with such reactive surface of the support member.

21. A process of preparing a wipe-on lithographic plate comprising directly coating a support member having a chemically reactive surface from organic solvent with an admixture of a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and a metal ester having the formula, $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; hydrolyzing the metal ester, heating to remove the solvent and deposit as a layer on the support member a reaction product of such silane and hydrolyzed metal ester while simultaneously reacting the hydrolyzed ester with the reactive surface of the support member; immersing the support member into an aqueous solution heated from about 30° C. to about 95° C. of an acrylic compound selected from the group consisting of acrylic acid, methacrylic acid, the ammonium, sodium, and potassium salts of said acids, acrylamide, and methyl acrylamide; again heating to react such layer with the acrylic compound through the vinyl groups of the silane reactant and deposit on the support member a hydrophilic layer essentially formed from such three reactants.

22. In a process of preparing a lithographic plate having a support member and an overlying lithographic sensitizer reactive to light to define printing and non-printing areas, the improvement of providing an intermediate coat between the support member and lithographic sensitizer characterized by directly coating a support member having an aluminum surface with an organic solvent containing tetraisopropyl titanate, and vinyl triethoxy silane, hydrolyzing the titanate, heating to remove the solvent and react with the aluminum surface the hydrolyzed titanate while simultaneously reacting such metal ester and such silane without destroying the vinyl groups of the latter to form a layer, and immersing the support member and layer into an aqueous solution heated from about 30° C. to about 95° C. of acrylic acid to react such layer with the acrylic compound and form over such first layer a second layer consisting essentially of the reaction product of such first layer and the acrylic acid through their common vinyl groups.

23. A process of forming a sub-layer on a lithographic plate adapted to form the non-printing areas thereof, comprising applying to a support member having a chemically active surface a metal ester having the formula, $(R_1O)_4Ti$, wherein $R_1$ is a monovalent hydrocarbon radical selected from the group consisting of phenyl, tolyl, xylyl, and aliphatic radicals of 1 to 8 carbon atoms; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromide; and an acrylic compound selected from the group consisting of acrylic acid, methacrylic acid, the ammonium, sodium, and potassium salts of said acids, acrylamide, and methyl acrylamide; hydrolyzing the ester; and interreacting such components to form on the support member a hydrophilic sub-layer while also reacting the hydrolyzed metal ester with such reactive surface of the support member.

24. A process of forming a sub-layer on a lithographic plate adapted to form the non-printing areas thereof, comprising applying to a support member having a chemically active surface a metal ester having the formula, $(R_1O)_4Zr$, wherein $R_1$ is a monovalent hydrocarbon radical selected from the group consisting of phenyl, tolyl, xylyl, and aliphatic radicals of 1 to 8 carbon atoms; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromide; and an acrylic compound selected from the group consisting of acrylic acid, methacrylic acid, the ammonium, sodium, and potassium salts of said acids, acrylamide, and methyl acrylamide; hydrolyzing the ester; and interreacting such components to form on the support member a hydrophilic sub-layer while also reacting the hydrolyzed metal ester with such reactive surface of the support member.

25. A wipe-on lithographic plate comprising a support member and a hydrophilic barrier layer overlying the support member adapted to form the non-printing areas of the plate; said barrier layer consisting essentially of the reaction product of a hydrolyzed metal ester having the formula prior to hydrolization, $(R_1O)_4Ti$, wherein $R_1$ is a monovalent hydrocarbon radical selected from the group consisting of phenyl, tolyl, xylyl, and aliphatic radicals of 1 to 8 carbon atoms; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and an acrylic compound selected from the group consisting of acrylic acid, methacrylic acid, the ammonium, sodium, and potassium salts of said acids, acrylamide, and methyl acrylamide; at least said metal ester being reacted with the support member through hydrolyzed groups of the ester as well as with said silane, said acrylic compound being reacted through its vinyl groups with those in the reaction product of the hydrolyzed metal ester and the silane contributed by the latter reactant.

26. A wipe-on lithographic plate comprising a support member and a hydrophilic barrier layer overlying the support member adapted to form the non-printing areas of the plate; said barrier layer consisting essentially of the reaction product of a hydrolyzed metal ester having the formula prior to hydrolyzation, $(R_1O)_4Zr$, wherein $R_1$ is a monovalent hydrocarbon radical selected from the group consisting of phenyl, tolyl, xylyl, and aliphatic radicals of 1 to 8 carbon atoms; a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and an acrylic compound selected from the group consisting of acrylic acid, methacrylic acid, the ammonium, sodium, and potassium salts of said acids, acrylamide, and methyl acrylamide; at least said metal ester being reacted with the support member through hydrolyzed groups of the ester as well as with said silane, said acrylic compound being reacted through its vinyl groups with those in the reaction product of the hydrolyzed metal ester and the silane contributed by the latter reactant.

27. In a lithographic plate having a metal-surfaced support member, an overlying layer of a coat of a lithographic sensitizer reactive to light to define printing and non-printing areas, and an intermediate coat between the support member and lithographic sensitizer; the improvement characterized by providing as said intermediate coat a barrier layer sufficiently hydrophilic to form the non-printing areas of the plate consisting essentially of dual strata; a first stratum contacting the metal surface of the support member comprising the reaction product of a hydrolyzed metal ester having the formula prior to hydrolyzation, $(R_1O)_4M$, wherein $R_1$ is a monovalent hydrocarbon radical selected from the group consisting of phenyl, tolyl, xylyl, and aliphatic radicals of 1 to 8 carbon atoms; and M is a metal selected from the group consisting of titanium, thorium, and zirconium; and a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; the reaction product of said first stratum being further adhered to the metal surface through reaction therewith by the hydrolyzed metal ester reactant; and a second stratum overlying the first and comprising a reaction product of said first stratum with an acrylic compound selected from the group consisting of acrylic acid, methacrylic acid, the ammonium, sodium, and potassium salts of said acids, acrylamide, and methyl acrylamide.

28. In a lithographic plate having a metal-surfaced support member, an overlying layer of a coat of a lithographic sensitizer reactive to light to define printing and non-printing areas, and an intermediate coat between the support member and the lithographic sensitizer; the improvement characterized by providing as said intermediate coat a barrier layer sufficiently hydrophilic to form the non-printing areas of the plate consisting essentially of triple strata, each stratum being chemically reacted with adjacent strata and the bottommost stratum being chemically reacted with the metal surface of the support member; a first stratum consisting essentially of the reaction product of said metal surface and a hydrolyzed metal ester; said ester prior to hydrolyzation having the formula $(R_1O)_4M$, wherein $R_1$ is a monovalent hydrocarbon radical selected from the group consisting of phenyl, tolyl, xylyl, and aliphatic radicals of 1 to 8 carbon atoms, and M is a metal selected from the group consisting of titanium, thorium, and zirconium; a second stratum overlying the first consisting essentially of a reaction product of said hydrolyzed ester of the first stratum and a polysiloxane condensed from a vinyl tri-substituted silane having the formula $CH_2CHSiR_3$, wherein R is a monovalent substituent selected from the group consisting of methoxy, ethoxy, propoxy, butoxy, pentoxy, phenoxy, tolyloxy, xylyloxy, chlorine, fluorine, iodine, and bromine; and a third stratum overlying the second consisting essentially of the reaction product of said second stratum through the vinyl groups thereof furnished by the polysiloxane reactant with an acrylic compound selected from the group consisting of acrylic acid, methacrylic acid, the ammonium, sodium, and potassium salts of said acids, acrylamide, and methyl acrylamide.

References Cited in the file of this patent

UNITED STATES PATENTS

| | | |
|---|---|---|
| 2,532,583 | Tyran | Dec. 5, 1950 |
| 2,598,453 | Slifkin | May 27, 1952 |
| 2,676,102 | Boyd et al. | Apr. 20, 1954 |
| 2,716,656 | Boyd | Aug. 30, 1955 |
| 2,721,855 | Kin | Oct. 25, 1955 |
| 2,751,314 | Kiel | June 19, 1956 |
| 2,760,432 | Wood | Aug. 28, 1956 |
| 2,768,907 | Lusby | Oct. 30, 1956 |
| 2,791,504 | Plambeck | May 7, 1957 |
| 2,714,066 | Jewett et al. | July 26, 1958 |
| 2,991,204 | Astle | July 4, 1961 |
| 3,064,562 | Deal | Nov. 20, 1962 |